3,026,324
PROCESS FOR THE MANUFACTURE OF PYRIDINE CARBOXYLIC ACID AMIDES
Paul Mueller and Robert Trefzer, Basel, Switzerland, assignors to Ciba Pharmaceutical Products Inc., Summit, N.J.
No Drawing. Filed July 12, 1960, Ser. No. 42,215
Claims priority, application Switzerland July 17, 1959
14 Claims. (Cl. 260—295)

The present invention provides a new process for the manufacture of pyridine-carboxylic acid amides.

The starting material used in the conventional processes for the manufacture of pyridine-carboxylic acid amides is a reactive derivative of a pyridine-carboxylic acid, more especially an ester, acid halide or nitrile thereof (see U.S. Patent No. 2,752,355 of May 28, 1954 to Otto Lustig; German Patent No. 828,247 of December 13, 1951 to Deutsche Gold- u. Siber-Scheideanstalt vormals Roessler; U.S. Patent No. 1,403,117 of July 6, 1921 to Max Hartmann et al.). There are, however, also known processes in which the free acid itself is used; in this case the reaction is performed either in the presence of a strong dehydrating agent, for example of an inorganic acid chloride or anhydride, that is to say of a compound which is difficult or dangerous to use on an industrial scale (see German Patent No. 653,873 of November 18, 1937 to Dr. R. Reiss; French Patent No. 793,633 of November 23, 1935 to Fabrique de Produits de Chimie Organique de Caire) or with ammonia or an amine under a very high pressure and at a very high temperature (U.S. Patent No. 2,453,706 of April 18, 1947 to Paul W. Garbo; U. S. Patent No. 2,617,805 of March 15, 1950 to Lennard J. Wissow; C. A. 49, 15892 [1955]).

The present invention is based on the observation that pyridine-carboxylic acid amides can be obtained by a process which is very easy to perform on an industrial scale, in a very good yield and immediately of a high degree of purity, by reacting a pyridine-carboxylic acid in the presence of sulphamic acid or of a salt thereof with ammonia or with an amine.

The pyridine-carboxylic acids used as starting material are $\alpha$-, $\beta$- or $\gamma$-carboxylic acids; their nucleus is unsubstituted or substituted by a lower alkyl group for instance a methyl, ethyl or propyl group, or by a lower alkoxy group for instance a methoxy or ethoxy group.

The amines used for the reaction are primary or secondary and may be aliphatic, araliphatic, cycloaliphatic, aromatic or heterocyclic; as examples may be mentioned alkylamines, cycloalkylamines, phenylamines, benzylamines, piperidines or aminopyridines. When a diamine is used, the final product is a di-pyridine-carboxylic acid amide. The reaction is advantageously performed with ammonia or with a di-lower alkylamine, for example dimethylamine and especially diethylamine.

The sulphamic acid is used in its free form or as a salt thereof, above all as the ammonium or an alkali metal salt. In the manufacture of N-unsubstituted amides the reaction can be performed in the presence of ammonium sulphamate, in which case no ammonia need be added.

The reaction is performed in the absence or presence of a solvent, preferably at a temperature within the range of 120 and 180° C. Suitable solvents are, above all, of inert substances whose boiling points are not below the reaction temperature, for example halogen-benzenes, such as mono- or dichlorobenzenes.

The following examples illustrate the invention.

*Example 1*

6.2 grams (0.05 molecular proportion) of nicotinic acid are mixed with 8.6 grams (0.075 molecular proportion) of ammonium sulphamate and 1 cc. of distilled ortho-dichloro-benzene at 20–25° C. The homogeneous mixture is heated to 160° C. while introducing dry ammonia gas into it, and then heated for ½ hour at 160–170° C., whereupon the reaction product has solidified and the nicotinic acid amide formed is exhaustively extracted from it with ortho-dichlorobenzene at 160–170° C. When the extract is filtered while hot and then cooled to 10–15° C., the nicotinic acid amide crystallizes out; it is suctioned off, washed with toluene and dried in vacuo.

The yield of nicotinic acid amide amounts to over 90% of theory, calculated from nicotinic acid.

*Example 2*

739 grams (6 molecular proportions) of nicotinic acid are mixed at room temperature with 2054 grams (18 molecular proportions) of ammonium sulphamate and 74 grams of distilled ortho-dichlorobenzene, and the mixture is continuously worked in a kneader at 165–175° C. The reaction product is exhaustively extracted with ortho-dichlorobenzene at 160–170° C. and then worked up as described in Example 1.

The yield of nicotinic acid amide amounts to over 90% of theory, calculated from nicotinic acid.

*Example 3*

12.3 grams (0.1 molecular proportion) of isonicotinic acid is fused at 135° C. with 34.2 grams (0.3 molecular proportion) of ammonium sulphamate and heated within 15 minutes to 165° C. while introducing dry ammonia gas into it and vigorously stirring the mixture. The melt is heated for 45 minutes at 163–167° C. whereupon 30 cc. of distilled ortho-dichlorobenzene are added dropwise within 45 minutes at the same temperature to the pasty reaction mixture. The reaction product is then exhaustively extracted with ortho-dichlorobenzene at 160–170° C. The extract is filtered while still hot and then cooled to 10–15° C. whereupon the isonicotinic acid amide crystallizes out quantitatively; it is suctioned off, washed with toluene and dried in vacuo.

The yield of isonicotinic acid amide amounts to about 90% of theory, calculated from isonicotinic acid.

*Example 4*

369.5 grams (3 molecular proportions) of isonicotinic acid are mixed at room temperature with 1027 grams (9 molecular proportions) of ammonium sulphamate and 60 cc. of distilled ortho-dichlorobenzene and then worked continuously in a kneader at 160–165° C. The reaction product is exhaustively extracted with ortho-dichlorobenzene at 160–165° C. and then worked up as described in Example 3.

The yield of isonicotinic acid amide amounts to about 90% of theory, calculated from isonicotinic acid.

*Example 5*

234 grams (3.2 molecular proportions) of diethylamine are run within 15 minutes into a mixture of 492.5 grams (4.0 molecular proportions) of nicotinic acid and 2400 cc. of distilled monochlorobenzene, kept at 20–25° C., with exclusion of moisture and with vigorous stirring. The whole is then heated to 128° C. and, while being refluxed at 128–132° C., treated within 8 hours simultaneously with 466 grams (4.8 molecular proportions) of sulphamic acid and 409.5 grams (5.6 molecular proportions) of diethylamine. In the course of 1 hour 29.5 grams (0.4 molecular proportion) of diethylamine are then added dropwise and the whole is stirred at the same temperature for 15 hours longer. The reaction product is cooled to 70° C., sodium hydroxide solution of 30% strength (about 30 cc.) is added until a pale-orange coloration is obtained by a spot test on moist Brilliant Yellow paper, and 800 cc. of water are added. The aqueous salt solution is separated at 65–70° C. and exhaustively extracted at the same temperature with 1 liter of monochlorobenzene. The combined monochlorobenzene extracts are evaporated in a water-jet vacuum. The reaction product forming the distillation residue is subjected to fractional distillation at about 90° C. under 0.01 mm. Hg pressure.

The yield of nicotinic acid diethylamide amounts to over 90% of theory, calculated from nicotinic acid.

From the aqueous salt solution the excess diethylamine can be recovered in the usual manner.

*Example 6*

417 grams (5.7 molecular proportions) of diethylamine are run within 15 minutes into a mixture of 739 grams (6.0 molecular proportions) of nicotinic acid and 3600 cc. of distilled monochlorobenzene, maintained at 20–25° C., with exclusion of moisture and while stirring vigorously.

The solution is treated with 150 grams of calcined sodium sulphate and then heated. While refluxing at 128–132° C. there are then slowly added within 10 hours, alternately, a total of 706 grams (7.2 molecular proportions) of sulphamic acid of 99% strength in 9 portions (of 279.5, 161.8, 73.5, 64.7, 47.1, 38.2, 20.6, 11.8 and 8.8 grams) and 592 grams (8.1 molecular proportions) of diethylamine in 9 portions (of 230, 121, 55, 48, 44, 37, 26, 20 and 11 grams). The whole is then stirred on for 15 hours at the same temperature. The reaction product is then cooled to 70° C., 1200 cc. of water are added, and the mixture is treated with about 100 cc. of dilute sodium hydroxide solution to produce a pale-orange coloration on Brilliant Yellow paper. The aqueous salt solution is separated at 65–70° C. and exhaustively extracted at the same temperature with 1500 cc. of monochlorobenzene. The combined monochlorobenzene extracts and the salt solution are then worked up as described in Example 5.

The yield of nicotinic acid diethylamide amounts to over 90% of theory, calculated from nicotinic acid.

*Example 7*

73.1 grams (1.0 molecular proportion) of diethylamine is added dropwise within 15 minutes to a mixture of 123 grams (1.0 molecular proportion) of nicotinic acid and 600 cc. of distilled monochlorobenzene, kept at 20–25° C., with exclusion of moisture and with vigorous stirring. The solution is heated and while being refluxed at 128–132° C. treated slowly within 10 hours, alternately, with a total of 131.0 grams (1.1 molecular proportions) of sodium sulphamate in 7 portions (of 65.5, 32.8, 16.4, 8.2, 4.1, 2.0 and 2.0 grams) and 73.1 grams (1.0 molecular proportion) of diethylamine in 7 portions (of 36.6, 18.3, 9.1, 4.5, 2.3, 1.2 and 1.1 grams). The whole is then stirred for 15 hours longer at the same temperature. During the reaction period approximately the equimolecular amount of ammonia gas, calculated from the sodium sulphamate used, escapes. The reaction product is cooled to 70° C., treated with 350 cc. of water, and a small amount of dilute sodium hydroxide solution is added to produce a pale-orange coloration on Brilliant Yellow paper. At 65–70° C. the aqueous sodium diethylammonium sulphate solution is separated and exhaustively extracted at the same temperature with 200 cc. of monochlorobenzene. The combined monochlorobenzene extracts and the aqueous salt solution are worked up as described in Example 5.

The yield of nicotinic acid diethylamide amounts to over 90% of theory, calculated from nicotinic acid.

*Example 8*

36.6 grams (0.5 molecular proportion) of diethylamine is added dropwise within 15 minutes to a mixture of 61.6 grams (0.5 molecular proportion) of nicotinic acid and 250 cc. of distilled monochlorobenzene, kept at 20–25° C., with exclusion of moisture and while stirring vigorously. The solution is heated and while being refluxed at 128–132° C. slowly treated within 10 hours, alternately, with a total of 62.8 grams (0.55 molecular proportion) of ammonium sulphamate in 6 portions (of 31.4, 15.7, 7.8, 3.9, 2.0 and 2.0 grams) and 40.2 grams (0.55 molecular proportion) of diethylamine in 6 portions (of 20.1, 10.1, 5.0, 2.5, 1.3 and 1.2 grams). The whole is then stirred for 15 hours longer at the same temperature. During the reaction period approximately the equimolecular amount of ammonia gas, calculated from the ammonium sulphamate used, escapes. The reaction product is cooled to 70° C., 100 cc. of water are added, and the whole is treated with a small amount of dilute sodium hydroxide solution to produce a pale-orange coloration on Brilliant Yellow paper. At 65–70° C. the aqueous ammonium diethylammonium sulphate solution is separated and exhaustively extracted at the same temperature with 150 cc. of monochlorobenzene. The combined monochlorobenzene extracts and the aqueous salt solution are worked up as described in Example 5.

The yield of nicotinic acid diethylamide amounts to over 90% of theory, calculated from nicotinic acid.

What is claimed is:

1. In the process for the manufacture of pyridine-carboxylic acid amides by reacting a pyridine-carboxylic acid with a member selected from the group consisting of ammonia, an amine and an ammonium salt, the step which comprises carrying out the reaction in the presence of at least one equivalent amount of a member of the group consisting of sulphamic acid, the ammonium salt thereof and the alkali metal salt thereof.

2. Process as claimed in claim 1, wherein the reaction is carried out at a temperature of 120 to 180° C.

3. Process as claimed in claim 1, wherein the reaction is performed in the presence of an inert solvent.

4. Process as claimed in claim 1, wherein nicotinic acid is used as starting material.

5. Process as claimed in claim 1, wherein isonicotinic acid is used as starting material.

6. Process as claimed in claim 1, wherein 1 mol of pyridine-carboxylic acid is reacted with about 3 mols of ammonium sulphamate in the presence of a small amount of an inert solvent.

7. Process as claimed in claim 1, wherein 1 mol of nicotinic acid is reacted with about 1.5 mol of ammonium sulphamate at 160 to 170° C. in an inert solvent while introducing ammonia.

8. Process as claimed in claim 1, wherein orthodichlorobenzene is used as inert solvent.

9. Process as claimed in claim 1, wherein nicotinic acid is reacted with diethylamine.

10. Process as claimed in claim 1, wherein 1 mol of nicotinic acid is reacted with about 2 mols of diethylamine in the presence of about 1 mol of the ammonium salt of sulphamic acid.

11. Process as claimed in claim 10, wherein the reaction is carried out at about 130° C.

12. Process as claimed in claim 11, wherein monochlorobenzene is used as solvent.

13. Process as claimed in claim 1, wherein 1 mol of nicotinic acid is reacted with about 2 mols of diethylamine in the presence of about 1 mol of sulfamic acid.

14. Process as claimed in claim 1, wherein 1 mol of nicotinic acid is reacted with about 2 mols of diethylamine in the presence of about 1 mol of the alkali metal salt of sulfamic acid.

References Cited in the file of this patent

UNITED STATES PATENTS 2,419,831 Garbo _____ Apr. 29, 1947
2,453,706 Garbo _____ Nov. 16, 1948

OTHER REFERENCES

Kirsanov et al.: Chem. Abstracts, vol. 44, column 6385 (1950).

UNITED STATES PATENT OFFICE
CERTIFICATE OF CORRECTION

Patent No. 3,026,324            March 20, 1962

Paul Mueller et al.

It is hereby certified that error appears in the above numbered patent requiring correction and that the said Letters Patent should read as corrected below.

Column 1, line 18, for "Siber" read -- Silber--; same column, line 33, for "15892" read -- 15892 h --; column 2, lines 32 and 38, for "C. whereupon" read -- C., whereupon --.

Signed and sealed this 30th day of October 1962.

(SEAL)
Attest:

ERNEST W. SWIDER
Attesting Officer

DAVID L. LADD
Commissioner of Patents